(12) United States Patent
Willkens et al.

(10) Patent No.: US 6,474,492 B2
(45) Date of Patent: Nov. 5, 2002

(54) MULTIPLE HOT ZONE IGNITERS

(75) Inventors: Craig A. Willkens, Sterling; Normand P. Arsenault, Holden, both of MA (US); Sebastien R. Bardon, Cheval Blanc (FR)

(73) Assignee: Saint-Gobain Ceramics and Plastics, Inc., Worcester, MA (US)

( * ) Notice: Subject to any disclaimer, the term of this patent is extended or adjusted under 35 U.S.C. 154(b) by 0 days.

(21) Appl. No.: 09/790,747

(22) Filed: Feb. 22, 2001

(65) Prior Publication Data

US 2002/0113051 A1 Aug. 22, 2002

(51) Int. Cl.⁷ ................................. F23Q 7/22
(52) U.S. Cl. .................. 215/270; 219/539; 219/544
(58) Field of Search ................ 219/270, 544, 219/539, 476, 477, 478; 123/145 A; 338/239, 260, 261, 295; 60/303

(56) References Cited

U.S. PATENT DOCUMENTS

| 4,535,589 | A | * | 8/1985 | Yoshida et al. | ............... 60/303 |
| 5,514,630 | A | * | 5/1996 | Willkens et al. | ............... 501/89 |
| 5,750,958 | A | * | 5/1998 | Okuda et al. | ............... 219/267 |
| 5,820,789 | A | * | 10/1998 | Willkens et al. | ............ 252/516 |
| 6,297,183 | B1 | * | 10/2001 | Willkens et al. | ............... 501/88 |

* cited by examiner

*Primary Examiner*—Teresa Walberg
*Assistant Examiner*—Vinod D Patel
(74) *Attorney, Agent, or Firm*—Mike W. Crosby; Peter F. Corless; Edwards & Angell, LLP

(57) ABSTRACT

The present invention relates to ceramic igniter devices, and more particularly, to such devices that contain two or more segregated hot zone regions that are electrically connected such as in series or in parallel. These devices are suitably incorporated in a variety of devices, including diesel fuel filters.

46 Claims, 2 Drawing Sheets

MULTIPLE HOT ZONE IGNITERS

BACKGROUND

1. Field of the Invention

The present invention relates to ceramic igniter devices, and mo-re particularly, to such devices that contain two or more hot zone regions that are electrically connected such as in series or in parallel. These devices are suitably incorporated in a variety of devices, including diesel fuel filters and gas burner apparatus.

2. Background

Ceramic materials have enjoyed great success as igniters in gas-fired furnaces, stoves and clothes dryers. Ceramic igniter production includes constructing an electrical circuit through a ceramic component a portion of which is highly resistive and rises in temperature when electrified by a wire lead. See, for instance, U.S. Pat. Nos. 6,028,292; 5,801,361; 5,405,237; and 5,191,508.

Typical igniters have been generally rectangular-shaped elements with a highly resistive "hot zone" at the igniter tip with one or more conductive "cold zones" providing to the hot zone from the opposing igniter end. One currently available igniter, the Mini-Igniter™, available from Norton Igniter Products of Milford, N. H., is designed for 12 volt through 120 volt applications and has a composition comprising aluminum nitride ("AlN"), molybdenum disilicide ("$MoSi_2$"), and silicon carbide ("SiC").

While current ceramic igniters provide good performance for many applications, for at least certain applications the need continues for ceramic igniters with improved properties. For a variety of reasons, ceramic igniters also have not been considered suitable for other applications that nevertheless require a heating or ignition element.

It thus would be desirable to have new ceramic igniters. It also would be desirable to have new ceramic igniters that could be employed in new applications.

SUMMARY OF THE INVENTION

We now provide new ceramic igniters that comprise multiple "hot" or ignition zones. The igniters are useful for a wide range of applications. We have found the igniters of the invention are particularly useful to provide a thermal or ignition element over an extended area. Igniters of the invention are especially useful as an ignition element for fuel traps as well as gaseous fuel burners that have fuel outlets over an extended area.

Preferred igniters of the invention comprise at least two, and suitably three, four, five, six or more hot zones in a single, integral sintered ceramic igniter element. Each hot zone is isolated, e.g. electrically and/or thermally segregated from an adjacent hot zone by an interposed insulative and/or conductive regions. An insulative region has a higher resistivity than the bordering hot zone. Conductive zones provide current to the hot zone regions.

Preferred insulators of the invention comprise one or more, and preferably two, conductive regions that traverse a substantial length of the igniter element. Multiple hot zone regions are disposed throughout the igniter element and communicate with the one or more conductive regions.

The multiple hot zones of a sintered element of the invention are suitably arranged either in series or parallel electrical connection. Application of an electric voltage differential across the igniter device can energize each of the hot zones substantially simultaneously such that each hot zone reaches about the same operational temperature within about the same time to temperature.

We have found that igniters of the invention with multiple hot zones can provide effective heating elements and ignition sources throughout a wide area. In particular, we have found that igniters of the invention can be incorporated into fuel exhaust systems such as diesel traps and provide effective ignition and removal of solids deposited within the trap apparatus. Accordingly, the invention features filters, particularly diesel exhaust filters, that include at least one ceramic multiple igniter element of the present invention.

Igniters of the invention also are particularly useful to provide fuel ignition over an extended area. Specifically preferred is use of an igniter of the invention in a gaseous fuel system where the fuel is dispensed over an extended area, for instance, a gas burner that contains multiple levels of gas outlet ports.

Methods also are provided for preparing ceramic multiple igniter elements and related filters of the invention. Additional methods include igniting material deposited on a filter element, including a diesel trap filter element, using a multiple igniter element of the invention.

Other aspects of the invention are disclosed infra.

DETAILED DESCRIPTION OF THE INVENTION

As indicated above, the invention provides a sintered ceramic multiple igniter element comprising a plurality of hot zones suitably arranged in series or in parallel and wherein preferably each hot zone contacts a conductive cold zone, preferably each hot zone is disposed between two cold zones to provide a parallel circuit arrangement. Suitable serial designs including segregating multiple hot zones with interposed conductive zones. Application of an electric voltage potential across an element of the present invention can energize each of the element's multiple hot zones substantially simultaneously.

More specifically, preferred ceramic multiple igniter elements of the invention include 1) two or more hot spots; 2) at least two electroconductive regions to deliver current and a voltage potential to each hot spot of the element; and 3) one or more insulating regions. The conductive regions are preferably rails or other suitable constructs to uniformly deliver electrical current and voltage to each hot zone of the device. The hot zones include a ceramic composition that when energized by an electrical potential becomes hot, e.g. the temperature of the hot spots increases to about 800° C. to about 1500° C. or more in about 1 to 10 seconds, preferably about 5, 4, or 3 seconds or less. Insulating regions are suitably located relative to the conductive regions and the hot zones such that the insulator regions prevent the device from shorting (arcing).

Multiple hot zones of an igniter of the invention are preferably non-contiguous in some respect, i.e. the hot zones are segregated with respect to temperature or heating regions. Thus, one or more insulative or conductive zones can be interposed between adjacent hot zones. The hot zone regions reach an operational temperature at least about 200, 300, 400, 500, 600, 700, 800, 900, 1000 or 1200 degrees higher than adjoining igniter regions (e.g. conductive or insulator regions) interposed between the hot zone regions.

Figure 1:
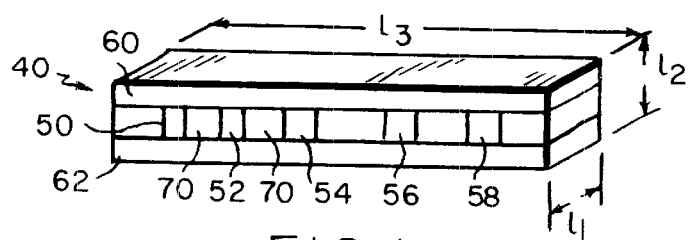
FIG. 1 depicts a preferred igniter of the invention.

Referring now to the drawings, FIG. 1 depicts a schematic illustration of a preferred ceramic multiple igniter element 40 wherein the hot zones are disposed in a parallel arrangement. Hot zones 50, 52, 54, 56 and 58 are disposed between two electroconductive layers 60 and 62. Adjacent hot zones, such as 50 and 52 are separated by insulative zone 70 which is substantially composed of a thermally stable electrically insulating material. The dimensions, $l_1$, $l_2$ and $l_3$ of the element are determined by the application needs, and also by electrical, operating temperature, time to temperature (TTT), and like requirements. Electrical wires (not shown) can be connected at opposite ends of the sintered element 40, one attached to each electroconductive layer 60 and 62.

In certain preferred embodiments of the present invention, multiple igniter elements comprise from 2 to about 20 or more hot zones arrayed in series or in parallel, more preferably in parallel. The elements can have a variety of number of hot zones elements, e.g. 2, 3, 4, 5, 6, 7, 8, 9, 10, 11, 12, 13, 14, 15, 16, 17, 18, 19, 20 or more. Elements can vary in length such that $l_3$ can suitably be any length from about 1 inch to about 24 inches depending on a specified application. Preferred values of $l_3$ are dependent on the nature of the application. Clearly applications that involve large devices, e.g. large filters, require larger multiple igniter elements than applications that involve small devices. Similarly the magnitude of dimensions $l_1$, and $l_2$ can vary. In preferred embodiments $l_1$ can suitably range from about 0.01 to 0.5 inches and $l_3$ can range from about 0.1 to about 1 inch.

A particularly preferred multiple igniter element of the present invention suitable for use with a standard oval Ibiden filter comprises 5 hot zones arrayed in parallel in a device that is about 6 to about 8 inches in length ($l_3$) with a cross section such that $l_1$ ranges from about 0.1 to about 0.4 inches and $l_3$ ranges from about 0.05 to about 0.25 inches.

Preferred geometries for multiple igniter elements wherein the hot zones are arranged in parallel include rectangular, trapezoidal, and like prisms or rods, where rectangular rods are particularly preferred. In specific embodiments, a parallel multiple igniter element with a rectangular prismatic geometry are defined by three dimensions $l_1$, $l_2$ and $l_3$ such that $l_1$ and $l_2$ define the cross-section of the element, $l_3$ is the length of the element and the $l_3$ dimension is generally longer than either the $l_1$ or $l_2$ dimensions.

In specific embodiments of the present invention, a rectangular rod shaped multiple igniter element includes a middle layer disposed between two ceramic or composite metal/ceramic electroconducting layers that are stacked along the axis defined by the $l_2$ dimension of the element, the middle layer is composed of alternating regions of insulating and hot zone compositions where the zones are arrayed along the $l_3$ dimension and each hot zone is disposed between two insulating zones. Lead wires are attached to the multiple igniter element with one lead wire attached to each electroconducting ceramic layer to provide the voltage potential necessary to energize the hot zones. Other suitable arrangement of electroconductive, hot zone and insulating regions that generate an element with two or more hot zones are also included in the present invention.

In specific embodiments of the present invention, a metallic film has been applied to the surface of the electroconductive layers multiple igniter element particularly to the surface defined by the $l_1$ and $l_3$ dimensions such that the distance between the applied metal film and the hot zones of the multiple igniter element is maximized. The sintered metal coating increases the conductivity of the electroconductive layers thereby increasing the current delivered to the hot zones and providing more uniform voltage potential such that each hot zone experiences the same voltage potential and current. The metal coating is applied to or painted on the exterior surfaces of the conductive layers of the ceramic multiple igniter element as a paste or like composition of finely divided metal particles and then sintered at elevated temperature to produce a metallic film. Preferably, the metal film is sintered at about 800° C. to 1000° C. such that a stress free metal film is produced at sintering temperatures. Upon cooling the metal coated multiple igniter element, metal/ceramic composite electroconductive layers are produced in which the ceramic component is under compression and the metal film is under tension.

In a specific embodiment of the present invention, a multiple igniter element has five hot zones regularly displaced along the $l_3$ dimension of the element and each hot zone is disposed between two electrically insulating cold zones wherein $l_3$ is about six inches. Each multiple igniter element is attached to the filter with a suitable thermally stable electrically insulating ceramic adhesive as is practiced in the art. Further, each element is preferably arranged such that some or all of the hot zones of the affixed multiple igniter elements are located on or near the junction of two or more extruded components of the filter element (e.g. an oval Ibiden filter).

Figure 2:
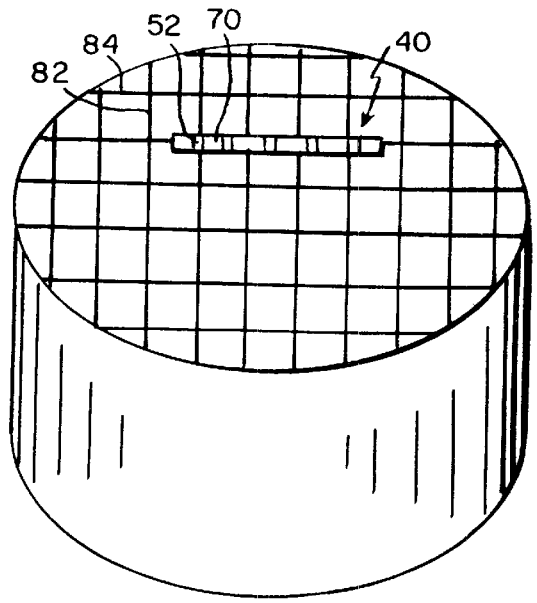
FIG. 2 shows a filter element with an igniter of the invention.
Figure 3:
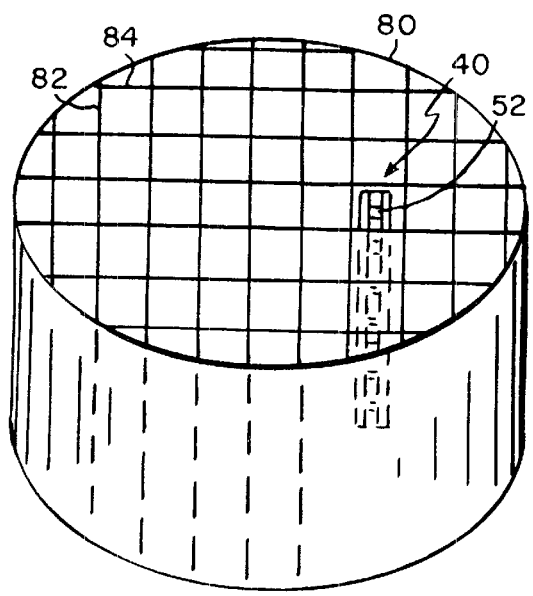
FIG. 3 shows a filter element longitudinally disposed within an igniter of the invention.
Figure 4:
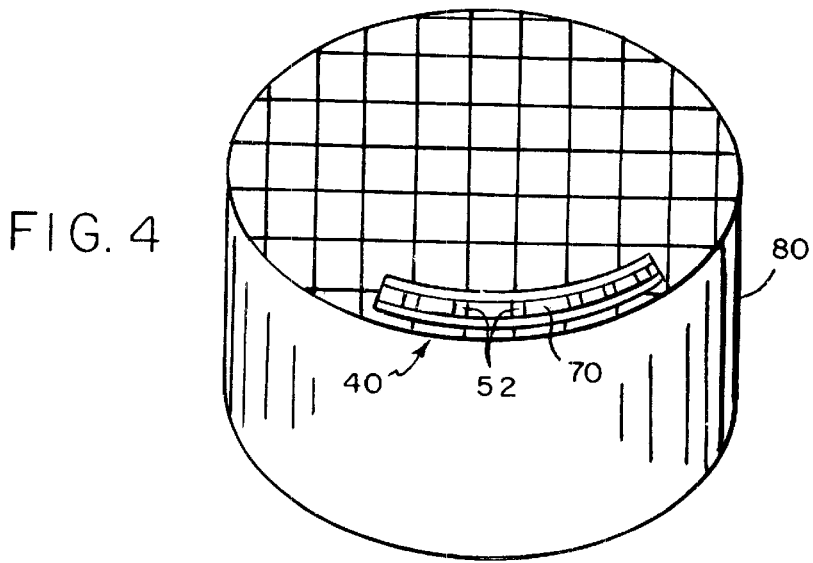
FIG. 4 shows a filter element with a curved igniter of the invention.

FIGS. 2 through 4 show various configurations of a filter assembly 80 with a multiple hot zone igniter 40 of the invention. As shown in FIGS. 2–3, a suitable fuel filter element 80 can include cross-hatched filter vanes 82 and 84 through which a exhaust gas or other gaseous material can flow. In preferred arrangements, the hot zones 52 of an igniter 40 are aligned or placed to cover an intersection of filter vanes 82 and 84.

An igniter of the invention can be disposed in a filter element in a variety of configurations. As shown in FIG. 2, an igniter 40 can be disposed over the top face of filter 80. Alternatively, as shown in FIG. 3, an igniter element 40 can be suitably disposed longitudinally through the filter 80, again preferably with hot zones 52 positioned at junctions of filter vanes 82 and 84. The igniter element also can be a variety of shapes, including non-linear shapes, such as curved configurations as shown by filter 40 which generally matches or corresponds to the outer shape of igniter 80.

Figure 5:
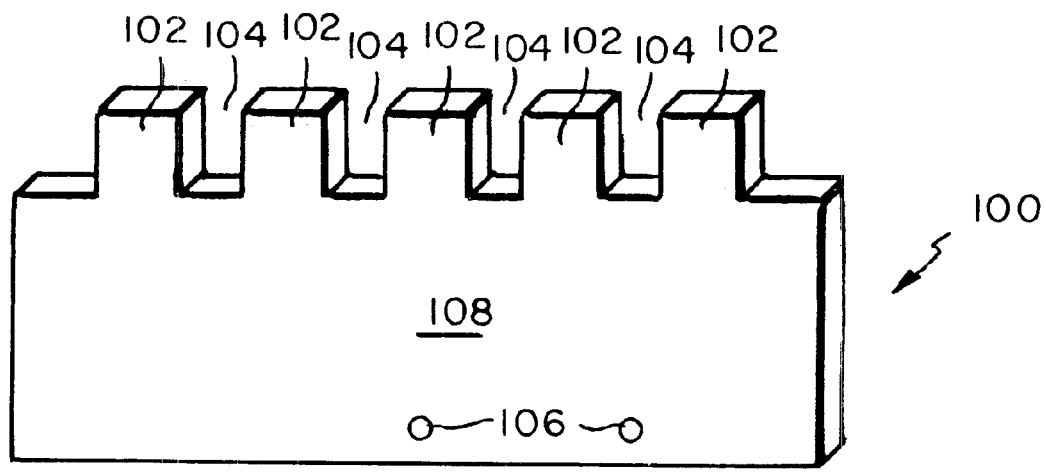
FIG. 5 shows a slotted igniter design of the invention.

FIG. 5 depicts another suitable igniter 100 of the invention where each hot zone 102 is segregated from adjacent hot zones by an insulating void or slot region 104. Electrical connection 106 can be made to opposing faces of the igniter and current can be supplied through conductive regions 108.

Figure 6:
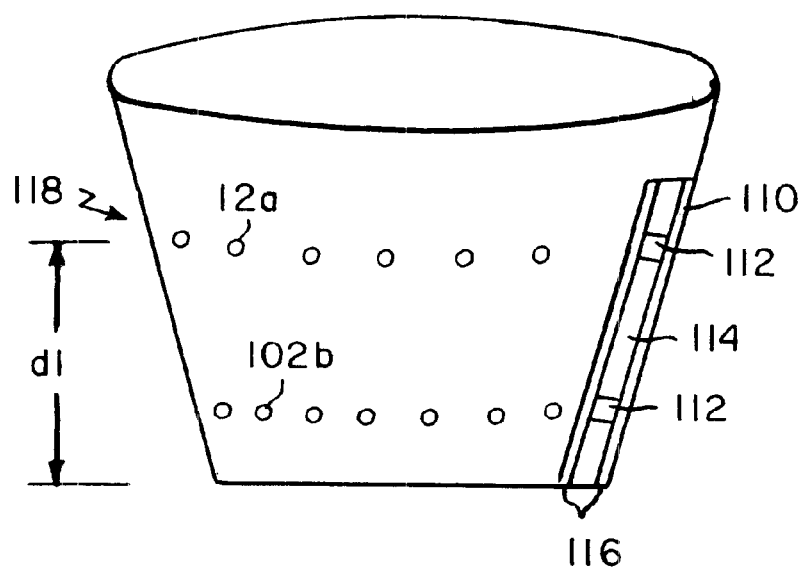
FIG. 6 shows a gas burner apparatus that contains an igniter of the invention.

FIG. 6 shows another preferred system, where an igniter 110 of the invention with multiple hot zones 112 with interposed insulative zones 114 and conductive zones 116 provides ignition to a gas burner 118 that has multiple, spaced levels of gas fuel outlets 120a and 120b. The gas burner 118 is suitably for food cooking, with the top fuel outlet 120a used for providing more intense thermal energy and the lower burner 120b used for lower temperature cooking, e.g. a simmer setting. Igniter 110 can effectively span between (distance d1) the fuel outlets 120a and 120b. Distance d1 (i.e. the distance between each spaced level of fuel outlets) is suitably about 0.2 cm, 0.5 cm, 0.8 cm, 1 cm, 1.2 cm, 1.5 cm, 1.8 cm, 2 cm, 2.2 cm, 2.4 cm, 2.5 cm, 2.8 cm, 3 cm or more. Moreover, an igniter of the invention can provide such ignition energy over a wide area with efficient power consumption, e.g. relative to an igniter that has a single, extended length hot zone region.

Such gas burners may have two, three, four or five or more, multiple, spaced levels of gas fuel outlets. More typically, such gas burners will have two or three multiple, spaced levels of gas outlets. Igniters of the invention also may be suitably used in used in gas burners (e.g. heating furnace for residence or commercial building) that have an extended length of gas outlets.

A variety of compositions may be employed to form an igniter of the invention. Generally preferred hot zone compositions comprise at least three components of 1) conductive material; 2) semiconductive material; and 3) insulating material. Cold zones and insulative zones may be comprised of the same components, but with the components present in differing proportions. Typical conductive materials include e.g. molybdenum disilicide, tungsten disilicide, nitrides such as titanium nitride, and carbides such as titanium carbide. Typical semiconductors include carbides such as silicon carbide (doped and undoped) and boron carbide. Typical insulating materials include metal oxides such as alumina or a nitride such as AlN.

For the purposes of the present invention, the term electrically insulating material refers to a material having a room temperature resistivity of at least about $10^{10}$ ohms-cm. The electrically insulating material component of igniters of the invention may be comprised solely of one or more metal oxides, or alternatively, the insulating component may contain materials in addition to the metal oxide(s). For instance, the insulating material component may additionally contain a nitride such as aluminum nitride (AlN), silicon nitride, or boron nitride; a rare earth oxide (e.g. yttria); or a rare earth oxynitride. A preferred added material of the insulating component is aluminum nitride (AlN).

For the purposes of the present invention, a semiconductor ceramic (or "semiconductor") is a ceramic having a room temperature resistivity of between about 10 and $10^8$ ohm-cm. If the semiconductive component is present as more than about 45 v/o of a hot zone composition (when the conductive ceramic is in the range of about 6–10 v/o), the resultant composition becomes too conductive for high voltage applications (due to lack of insulator). Conversely, if the semiconductor material is present as less than about 10 v/o (when the conductive ceramic is in the range of about 6–10 v/o), the resultant composition becomes too resistive (due to too much insulator). Again, at higher levels of conductor, more resistive mixes of the insulator and semiconductor fractions are needed to achieve the desired voltage. Typically, the semiconductor is a carbide from the group consisting of silicon carbide (doped and undoped), and boron carbide. Silicon carbide is generally preferred.

For the purposes of the present invention, a conductive material is one which has a room temperature resistivity of less than about $10^{-2}$ ohm-cm. If the conductive component is present in an amount of more than 25 v/o of the hot zone composition, the resultant ceramic of the hot zone composition, the resultant ceramic can become too conductive. Typically, the conductor is selected from the group consisting of molybdenum disilicide, tungsten disilicide, and nitrides such as titanium nitride, and carbides such as titanium carbide. Molybdenum disilicide is generally preferred.

In general, preferred hot zone compositions include (a) between about 50 and about 80 v/o of an electrically insulating material having a resistivity of at least about $10^{10}$ ohm-cm; (b) between about 5 and about 45 v/o of a semiconductive material having a resistivity of between about 10 and about $10^8$ ohm-cm; and (c) between about 5 and about 25 v/o of a metallic conductor having a resistivity of less than about $10^{-2}$ ohm-cm. Preferably, the hot zone comprises 50–70 v/o electrically insulating ceramic, 10–45 v/o of the semiconductive ceramic, and 6–16 v/o of the conductive material.

As discussed above, igniters of the invention typically also contain at least one low resistivity cold zone region in electrical connection with the hot zone to allow for attachment of wire leads to the igniter. Typically, a hot zone composition is disposed between two cold zones. Preferably, such cold zone regions are comprised of e.g. AlN and/or $Al_2O_3$ or other insulating material; SiC or other semiconductor material; and $MoSi_2$ or other conductive material. However, cold zone regions will have a significantly higher percentage of the conductive and semiconductive materials (e.g., SiC and $MoSi_2$) than does the hot zone. Accordingly, cold zone regions typically have only about 1/5 to 1/1000 of the resistivity of the hot-zone composition and do not rise in temperature to the levels of the hot zone. A preferred cold zone composition comprises about 15 to 65 v/o aluminum oxide, aluminum nitride or other insulator material; and about 20 to 70 v/o $MoSi_2$ and SiC or other conductive and semiconductive material in a volume ratio of from about 1:1 to about 1:3. More preferably, the cold zone comprises about 15 to 50 v/o AlN and/or $Al_2O_3$, 15 to 30 v/o SiC and 30 to 70 v/o $MoSi_2$. For ease of manufacture, preferably the cold zone composition is formed of the same materials as the hot zone composition, with the relative amounts of semiconductive and conductive materials being greater.

A specifically preferred cold zone composition for use in igniters of the invention contains 60 v/o $MoSi_2$, 20 v/o SiC and 20 v/o $Al_2O_3$. A particularly preferred cold zone compositions for use in igniters of the invention contains 30 v/o $MoSi_2$, 20 v/o SiC and 50 v/o $Al_2O_3$.

As discussed above, the multiple hot zones of an igniter of the invention may suitably comprise non-conductive regions interposed between the hot zone regions. Preferably, a sintered insulator region has a resistivity of at least about $10^{14}$ ohm-cm at room temperature and a resistivity of at least $10^4$ ohm-cm at operational temperatures and has a strength of at least 150 MPa. Preferably, an interposed insulator region has a resistivity at operational temperatures that is at least 2 orders of magnitude greater than the resistivity of the hot zone region. Suitable insulator compositions comprise at least about 90 v/o of one or more aluminum nitride, alumina and boron nitride. A specifically preferred insulator composition of an igniter of the invention consists of 13 v/o AlN; 77 v/o $Al_2O_3$; and balance SiC.

Preferred multiple igniter elements of the invention can heat rapidly to operational temperatures, e.g. to about 1300° C., 1400° C. or 1500° C. in about 5 or 4 seconds or less, or even 3, 2.5, or 2 seconds or less. Preferably all hot zones of a multiple igniter element have about the same operational temperature such that the temperature range is about 50° C. or 40° C. or less, or even 30 or 20° C. or less and all hot zones reach operational temperature in about the same amount of time, e.g. all hot zones of the element reach operational temperature within a 1 or 0.5 second time period or less, or even in a 0.4, 0.3, 0.2 or 0.1 second time period or less.

Further, preferred multiple igniter elements of the invention maintain effective thermal and electrical properties upon attachment to a filter. Further, the mechanical and thermo-mechanical resistances of the multiple igniter element are sufficient to permit use of one or more elements in a particle filter for extended time periods such that an element remains effective at regenerating a filter for a significant amount of time even under harsh conditions, e.g. inside an exhaust pipe of a combustion engine.

In one preferred aspect, a fuel exhaust filter is provided wherein at least one multiple hot spot igniter of the invention is attached to the intake face of the filter. The multiple igniter device is attached either lying flat so that both conductive rails and one face of each hot zone is in physical contact with the entrance face of the filter or the device is attached upright such that the exterior edge of one conductive rail is in physical contact with the entrance face of the filter and the hot zones and the second conductive rail are not in direct physical contact with the filter. Preferably, for filters that are constructed of two or more extruded components, a hot zone is proximally located to some or all of the intersections between adjacent extruded components.

Multiple igniter elements of the invention are suitably affixed to a filter with a ceramic adhesive. The ceramic adhesive creates a connection between the multiple igniter element(s) and the filter that is sufficiently robust to prevent dislocation of the element in a "shaking test". Additionally, preferably the mode of attachment deactivates as few rows of cells in the filter as possible to maintain maximum combustion propagation in the filter.

As discussed above, methods are also provided for preparing a ceramic multiple igniter element. A preferred method includes:

(a) compressing, e.g. by wavepress, alternating zones of an insulator composition and zones of hot zone composition until three or more alternating zones are compressed into a billet;

(b) compressing, e.g. by wavepress, a billet of electroconductive ceramic composition, e.g. the composition comprising a mixture of conductive, semiconducive and insulative materials such as AlN, MoSi$_2$ and SiC;

(c) forming (e.g. by cutting or machining) from the billet of alternating zones that are e.g. about 0.01 or 0.05 to about 0.5, 1, 1.5 inches thick;

(d) forming (e.g. by cutting or machining) the billet of conducting ceramic e.g. that are about 0.01 or 0.05 to about 1, 1.5. 2, 2.5 or more inches thick;

(e) stacking multiple tiles e.g. three tiles, one from step (c) and two from step (d), to form a sandwich of tiles, each sandwich comprising an end tile of electroconductive ceramic composition, a middle composite tile of insulating and hot zones and an end tile of electroconductive ceramic composition;

(f) compressing one or more sandwiches of tiles prepared in step (e) e.g. by hot isotactic pressing; and (g) forming an igniter element (e.g. a rod) from the compressed sandwich of tiles such that each rod formed comprises a middle composite layer of alternating zones with insulator and hot zone composition and end layers with an electroconductive ceramic composition.

Preferred methods also include metal film coating prepared electroconductive tiles, e.g. by subjecting the tiles to steps of:

(h) applying a composition (e.g. a paste) comprising a metal, a mixture of metals, an alloy or a mixture of alloys to the exterior surface of the ceramic conductive rails opposite the middle composite ceramic layer;

(i) heating the multiple hot spot igniter device to sinter the metal or alloy comprising paste thereby forming a metal film coating the conductive ceramic; and (j) cooling the sintered metal coated device such that the conductive ceramic rail is under compression and the metal coating is under tension.

General processing of a ceramic component (e.g. green body processing and sintering conditions) can be conducted in accordance with known procedures. See U.S. Pat. No. 5,405,237 to Washburn. Sintering of a hot zone composition is preferably conducted at relatively high temperatures, e.g. at or slightly about 1800° C. Sintering is typically conducted under pressure, e.g. either under a uniaxial press (hot press) or a hot isostatic press (HIP).

As discussed above, igniters of the present invention may be used in many applications, including gas phase fuel ignition applications such as furnaces and cooking appliances, baseboard heaters, boilers, and stove tops. As discussed above, a specifically preferred application of the multiple igniter element of the present invention are fuel ignition applications particularly with fuel filters, especially fuel filters of diesel engines as well as in gas burner appliances such as gas heating units and cooking units, particularly having extended gas outlet ports.

The following non-limiting examples are illustrative of the invention. All documents mentioned herein are incorporated herein by reference.

EXAMPLE 1

A multiple igniter element of the invention was prepared and tested as follows.

Hot zone, electrically insulating cold zone and electroconductive cold zone compositions were prepared. The hot zone composition comprised 70 parts by volume AlN, 10 parts by volume MoSi$_2$ and 20 parts by volume SiC, which were blended in a high shear mixer. The electroconductive cold zone composition comprised about 15 parts by volume AlN, about 40 parts by volume MoSi$_2$ and about 45 parts by volume SiC, which were blended in a high shear mixer. The electrically insulating cold zone composition comprised about 13 parts by volume of AlN, 77 parts by volume Al$_2$O$_3$; and balance SiC, which were blended in a high shear mixer.

A billet of alternating zones of electrically insulating cold zone composition and hot zone composition was prepared by wave pressing alternating compositions. A billet of electroconductive cold zone composition was prepared wavepress. The electroconductive cold zone composition billet and the billet comprising alternating layers of electrically insulating cold zone composition and hot zone composition were sliced to form 0.100 inch thick tiles. The billet comprising alternating layers of electrically insulating cold zone composition and hot zone composition was sliced perpendicular to the direction of layering the alternating compositions such that the tiles comprise alternating zones of electrically insulating composition and hot zone composition.

A three tile stack comprising a middle tile sliced from the billet comprising alternating layers of electrically insulating cold zone composition and hot zone composition disposed between outside tiles sliced from the electroconductive cold zone composition billet. The stack of tiles was pressed by glass hot isostatic pressed. Multiple igniter elements of the invention were prepared by slicing the pressed stack of tiles perpendicular to both the stacking direction of the tiles and the orientation of the alternating layers of electrically insulating cold zone composition and hot zone composition in the middle tile. The resulting element comprises a middle layer of alternating zones of hot zone composition disposed between two zones of electrically insulating cold zone composition where the middle layer is disposed between two outside layers composed of an electroconductive cold zone composition. The dimensions of the produced multiple igniter element are $l_1=0.040"$, $l_2=0.120"$ and $l_3=4"$.

EXAMPLE 2

A multiple igniter element that contains composite metal/ceramic electroconductive cold zone compositions was prepared as follows.

A multiple igniter element was prepared in general accordance with the method Example 1 above. A paste of platinum powder (Englehard INK A 4731) was applied to opposing surfaces of the electroconducting cold zone compositions of the multiple igniter element wherein each surface has a surface area of $l_2 \times l_3$ to achieve a platinum film thickness of about 0.003 to 0.005". The platinum coated element was sintered at about 800° C. to about 1000° C. After cooling, the platinum coated multiple igniter element has a metallic ring on dropping the element from a height of 6" and a tough tactile feel.

EXAMPLE 3

A multiple igniter element, which comprises composite metal/ceramic electroconductive cold zone compositions, was prepared as follows.

A multiple igniter element analogous to the platinum coated element of Example 2, wherein Inconel (Fe/Cr/Ni alloy) is applied to the multiple igniter element of Example 1. The Inconel comprising element was sintered to the platinum comprising element similarly as described in Example 2.

The invention has been described in detail with reference to particular embodiments thereof. However, it will be appreciated that those skilled in the art, upon consideration of this disclosure, may make modification and improvements within the spirit and scope of the invention.

What is claimed is:

1. A sintered ceramic igniter element comprising a plurality of hot zone regions, at least two of the regions thermally segregated with respect to each other whereby the two segregated hot zone regions reach an operational temperature of at least about 200° C. higher than adjoining conductive or insulator regions, and a conductive zone interposed between adjacent hot zone regions.

2. An element of claim 1 wherein a plurality of hot zones are arranged electrically in series.

3. An element of claim 1 wherein a plurality of hot zones are arranged electrically in parallel.

4. An element of claim 1 wherein an insulator region is interposed between two hot zone regions.

5. An element of claim 1 wherein the element comprises at least two conductive regions.

6. An element of claim 5 wherein the conductive regions each extends along opposing edges of the element and electrically communicate with each hot zone region.

7. An element of claim 5 wherein the conductive regions comprise a metallic film coating.

8. An element of claim 7 wherein the metal coating comprises Pt, Pd, or an Fe alloy.

9. An element of claim 1 wherein insulative or conductive zones are interposed between adjacent hot zones.

10. An element of claim 1 wherein adjacent hot zones are substantially electrically segregated.

11. An element of claim 1 wherein the element comprises a cold zone comprising from about 15 to 50 v/o of an insulator material; 0 to 50 v/o of a semiconductive material; and 20 to 70 v/o of a metallic conductive material.

12. An element of claim 11 wherein the cold zone insulator is aluminum nitride or aluminum oxide, or mixtures thereof; the cold zone semiconductive material is silicon carbide; and the cold zone conductive material is $MoSi_2$.

13. An element of claim 1 wherein the igniter comprises an insulator region that comprises from about 3 to 25 v/o of AlN; from about 60 to 90 v/o of $Al_2O_3$; and from about 8 to 15 v/o SiC.

14. An element of claim 1 wherein each hot zone comprises 50–70 v/o electrically insulating material, 10–45 v/o of the semiconductive material, and 6–16 v/o of the conductive material.

15. A fuel exhaust treatment apparatus, comprising a ceramic igniter element of claim 1.

16. The apparatus of claim 15 wherein the apparatus is a diesel fuel trap.

17. The apparatus of claim 15 wherein the element is connected to an electrical potential.

18. The apparatus of claim 15 wherein the apparatus comprises intersecting filter vanes extending through the apparatus.

19. The apparatus of claim 18 wherein one or more hot zones of the igniter are positioned at intersecting vanes.

20. The apparatus of claim 15 wherein an igniter element is positioned on a top face of the apparatus.

21. The apparatus of claim 15 wherein an igniter element extends longitudinally through the apparatus.

22. A fuel burning apparatus, comprising a ceramic igniter element of claim 1.

23. The apparatus of claim 22 wherein the apparatus comprises a gas burner with multiple, spaced levels of gas outlets.

24. A diesel filter assembly comprising:

a filter;

a sintered ceramic igniter element comprising a plurality of hot zone regions, at least two of the regions thermally segregated with respect to each other; the element attached to the filter.

25. The assembly of claim 24 wherein the element is located in front of the entrance face of the filter.

26. The assembly of claim 24 wherein hot zones of the element are positioned at intersections of filter elements.

27. The assembly of claim 24 wherein the element is attached to the filter with an adhesive.

28. The assembly of claim 24 wherein the assembly comprises a plurality of elements.

29. The assembly of claim 24 wherein a plurality of hot zones are arranged electrically in series.

30. The assembly of claim 24 wherein a plurality of hot zones are arranged electrically in parallel.

31. The assembly of claim 24 wherein the element comprises a conductive zone interposed between adjacent hot zones.

32. A sintered ceramic igniter element comprising a plurality of hot zone regions, at least two of the regions being thermally segregated with respect to each other, each hot zone comprising 50–70 v/o electrically insulating material, 10–45 v/o of a semiconductive material, and 6–16 v/o of a conductive material.

33. A sintered ceramic igniter element comprising a plurality of hot zone regions, at least two of the regions being thermally segregated with respect to each other,
   wherein the element comprises a cold zone comprising from about 15 to 50 v/o of an insulator material, 0 to 50 v/o of a semiconductive material, and 20 to 70 v/o of a metallic conductive material.

34. A cooking apparatus that contains a gas burner, the apparatus comprising a unitary sintered ceramic igniter element comprising a plurality of hot zone regions, at least two of the regions thermally segregated with respect to each other, whereby the two segregated hot zone regions reach an operational temperature of at least about 200° C. higher than adjoining conductive or insulator regions.

35. The cooking apparatus of claim 34 wherein the apparatus contains a gas burner with multiple, spaced levels of gas burners.

36. The cooking apparatus of claim 35 wherein the igniter element is disposed along the length of the spaced gas outlets.

37. A sintered ceramic igniter element comprising a plurality of hot zone regions, at least two hot zone regions thermally segregated with respect to each other whereby the two segregated hot zone regions reach an operational temperature of at least about 200° C. higher than adjoining conductive or insulator regions, and the two segregated hot zone regions proximate to a common conductive zone region.

38. An element of claim 37 wherein an insulator region is interposed between two hot zone regions.

39. An element of claim 37 wherein the element comprises a conductive zone interposed between adjacent hot zones.

40. The element of claim 37 wherein the two segregated hot zone regions are adjacent with respect to one another.

41. The element of claim 40 wherein the adjacent hot zone regions are substantially electrically segregated.

42. A sintered ceramic igniter element comprising four or more hot zone regions, at least two of the hot zone regions thermally segregated with respect to each other.

43. An element of claim 42 wherein the element comprises a conductive zone interposed between adjacent hot zones.

44. The element of claim 42 wherein the two segregated hot zone regions are adjacent with respect to each another.

45. The element of claim 42 wherein the adjacent hot zone regions are substantially electrically segregated.

46. The element of claim 42 wherein each of at least three hot zone regions of the element are thermally segregated with respect to each other.

* * * * *